Feb. 23, 1943.  S. K. KOTOWSKI  2,312,176
GLASS DRILL
Filed Jan. 29, 1941
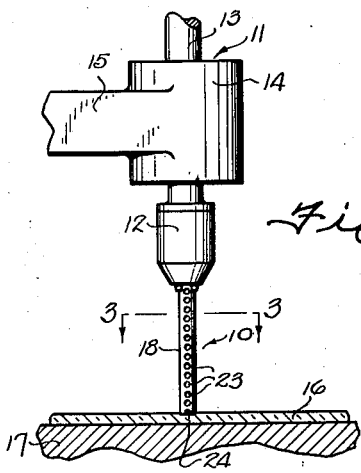
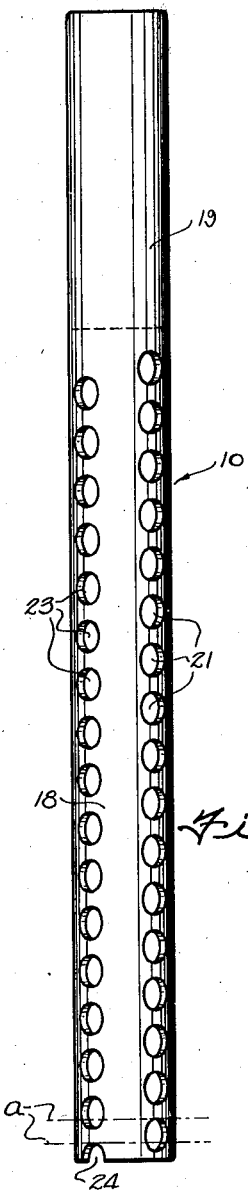
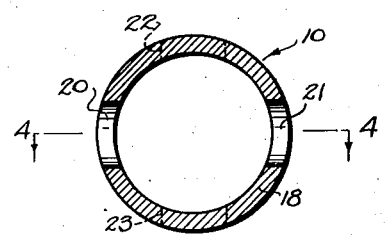
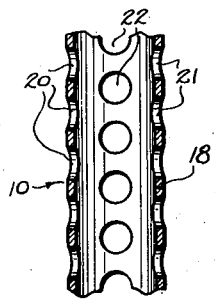
Inventor
STEPHEN K. KOTOWSKI
By Frank Fraser
Attorney Patented Feb. 23, 1943

2,312,176

UNITED STATES PATENT OFFICE 2,312,176

GLASS DRILL

Stephen K. Kotowski, Toledo, Ohio, assignor to Libbey-Owens-Ford Glass Company, Toledo, Ohio, a corporation of Ohio Application January 29, 1941, Serial No. 376,481

3 Claims. (Cl. 77—69)

The present invention relates broadly to the forming of openings in glass articles, such as glass sheets or plates, and more particularly to an improved form of drill.

One type of drill which has been heretofore employed for drilling holes in glass comprises a cylindrical tubular member formed of metal and longitudinally slotted at the drilling end thereof. This form of drill, however, is not entirely satisfactory for several reasons, among which may be mentioned that the metal tube wears away quite rapidly and can be used for drilling only a relatively small number of holes without being removed from the machine and reslotted. Considerable time is lost and effort required in the removal of the drill from the machine and the reslotting thereof. On the other hand, it is not practical to make the slots in the metal tube very long because it results in a definite weakening of the drill.

It is an aim of this invention to provide a novel type of drill for forming holes in glass so constructed that the necessity of periodically reslotting or otherwise servicing the same is eliminated to the end that when the drill is once placed in the drilling machine it can be allowed to remain therein until completely worn away; also to provide a drill having the required degree of rigidity and one capable of drilling a relatively large number of holes.

Other objects and advantages of the invention will become more apparent during the course of the following description, when taken in connection with the accompanying drawing.

In the drawing, wherein like numerals are employed to designate like parts throughout the same:

Fig. 1 is a side view of a portion of a drilling machine equipped with a novel form of drill provided by the present invention;

Fig. 2 is an enlarged elevation of the drill removed from the machine;

Fig. 3 is a horizontal section through the drill taken substantially on line 3—3 of Fig. 1; and Fig. 4 is a vertical section through the drill taken substantially on line 4—4 of Fig. 3.

With reference now to the drawing and particularly to Fig. 1, the novel form of drill herein provided is designated in its entirety by the numeral 10 and is carried by a drilling machine 11 of any suitable type. As here shown, the drill 10 is removably secured at its upper end within a chuck 12 provided at the lower end of a vertical drill spindle 13 which is rotatably and slidably mounted in a bearing 14 carried at the outer end of a horizontal supporting arm 15. The drill 10 is illustrated in Fig. 1 as being used for drilling a hole in a sheet or plate of glass 16 supported horizontally upon a table 17, but it will be readily apparent that the drill may be used for forming openings in any kind of glass article.

The drill 10 comprises a cylindrical metal member 18 of the desired length and also of a diameter corresponding to the size of opening to be formed. The upper end portion 19 of the cylindrical member 18, which is secured within the chuck 12 of the drilling machine, is preferably solid to afford the desired rigidity. The lower portion of the member 18 is in the form of a tube and is provided preferably throughout the length thereof with two series of holes 20 and 21, said holes being diametrically opposite and in alignment with one another. Also formed in the tubular portion of the drill and arranged at right angles to the holes 20 and 21 are the two additional series of holes 22 and 23, these holes being also diametrically opposed and in alignment with one another. As clearly shown in the drawing, the holes 22 and 23 are staggered with respect to the holes 20 and 21 so that the said holes 22 and 23 come within the spaces between the said holes 20 and 21. Further, the diameter of the holes 22 and 23 is relatively greater than the width of the spaces between the adjacent holes 20 and 21 and vice versa as indicated by the broken lines a in Fig. 2, with the result that, as the lower end of the drill is worn away, the bottoms of diametrically opposed holes will be opened up to form downwardly opening slots 24 which are of substantially inverted U-shape. In other words, assuming that when the drill is made two aligned holes 22 and 23 are cut substantially in half as shown in Fig. 2 to provide slots 24. As the lower edge of the drill is worn away, the bottoms of the holes 20—21 immediately above said holes 22—23 will be opened up to provide slots 24 and then the next pair of holes 22—23 and so on until the entire tubular portion of the drill is worn away.

The drilling of the glass is effected by a grinding or abrading operation in that a suitable abrasive material is suitably supplied to the glass at the lower end of the drill. The abrasive material will be picked up by the revolving drill and worked into the glass so as to cut a narrow circular hole therethrough by a grinding operation. The provision of the slots 24 permits the abrasive material which is used in connection with the cutting operation to work under the lower cutting edge of the drill. In other words, the slots permit the abrasive material to be brought into the path of travel of the cutting edge of the drill or, otherwise stated, into the area of cutting action. As the drill wears away, it can be gradually lowered either by gravity or by a positive feed.

With the type of drill herein provided, it will be readily seen that a pair of downwardly opening slots 24 will always be provided. This is due to the fact that as stated above the diameter of the holes in the drill is relatively greater than the space between vertically adjacent holes. Also, because of this arrangement, it is unnecessary to remove the drill from the machine periodically for reslotting or reservicing. Instead, the drill after once being placed in the machine can be used continuously until it is worn away up to the solid end portion 19 thereof.

It has been found by actual commercial use that a relatively greater number of holes can be drilled with this type of drill than with the old type of slotted drill without reslotting the prior art drill one or more times. The fact that the present drill does not have to be reslotted or otherwise reserviced results in a material saving of both time and labor.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a drill of the character described, a cylindrical metal tube provided with two series of holes arranged longitudinally thereof, the holes in the longitudinally arranged series being so staggered and the distance between holes in a series being such that as the tube wears away a new hole will be opened up to present an outwardly directed slot at the cutting edge of the drill.

2. In a drill of the character described, a cylindrical metal tube provided with two series of holes arranged longitudinally thereof, the holes of one series being spaced circumferentially from those in the other series and staggered axially with respect thereto, the holes in each series being spaced axially a distance less than the diameter of said holes so that as the tube wears away the holes of the two series will be alternately opened up to form outwardly directed slots at the cutting edge of the drill.

3. In a drill of the character described, a cylindrical metal tube provided with two series of holes arranged longitudinally thereof, said series of holes being diametrically opposed and in alignment with one another, two additional series of holes arranged at substantially right angles to the first two series of holes, the holes of said second two series being also diametrically opposed and in alignment with one another and staggered with respect to the holes of the first two series, the diameter of the holes of said second two series being relatively greater than the distance between the adjacent holes of said first two series so that as the metal tube wears away there will always be presented a pair of outwardly opening slots at the cutting edge of the drill.

STEPHEN K. KOTOWSKI.